Patented Sept. 24, 1940

2,215,857

UNITED STATES PATENT OFFICE 2,215,857

ALCOHOLIC AND KETONIC SUSPENSIONS OF TITANIUM PIGMENTS

Walter W. Plechner and Joseph M. Jarmus, Metuchen, N. J., assignors, by mesne assignments, to National Lead Company, New York, N. Y., a corporation of New Jersey No Drawing. Application November 5, 1936, Serial No. 109,314

13 Claims. (Cl. 134—58)

This invention relates to the dispersion of titanium pigments in aliphatic alcohols and ketones. It has particular reference to the dispersion of titanium dioxide pigments in aliphatic alcohols and ketones of lower molecular weight.

It is well recognized that dispersion of finely divided solids in liquid media involves phenomena which are only partially understood. The fact that a dispersing agent acts to disperse a certain solid in a certain liquid is no criterion that it will disperse that solid in other liquids, or that it will disperse other solids in the same liquid. Consequently, the problem of dispersing a given solid in a given liquid is largely one of trial and error. For instance, stearic acid, aluminum stearate, potassium hydroxide and other substances act as dispersing agents for titanium pigments in aqueous liquids, but are ineffective as dispersing agents for titanium oxide pigments in alcohol and ketones.

Dispersions of titanium pigments in aliphatic alcohols and ketones are desirable for many purposes, for instance, in the manufacture of quick-drying inks, shoe polishes and similar compositions. Such dispersions must be a homogeneous suspension of the titanium pigment in the alcohol or ketone from which the pigment settles out only very slowly. They must cover evenly a surface to which they are applied and must have low viscosity. The dispersion of titanium pigments is difficult but even greater difficulty is encountered when attempting to disperse titanium pigments in organic liquids such as aliphatic alcohols, ketones and the like. Consequently, up to the present time no satisfactory means for dispersing titanium pigments in organic liquids have been developed.

Thus, an object of our invention is a method for dispersing titanium pigments in aliphatic alcohols and ketones. Another object of our invention is the preparation of quick-drying compositions containing titanium pigments uniformly dispersed in an aliphatic alcohol or ketone medium. These and other objects of our invention will become apparent from the description and appended claims.

We have discovered that tannic acid compositions act as dispersing agents for titanium pigments in aliphatic alcohols and ketones. While tannic acid compositions are useful in preparing dispersions of titanium pigments in liquid aliphatic alcohols and ketones generally, they are particularly applicable to aliphatic alcohols having five or less carbon atoms per molecule, and to ketones having seven or less carbon atoms per molecule. This is true regardless of whether the aliphatic alcohol is a primary, secondary, or tertiary alcohol. Dispersions of titanium pigments in aliphatic alcohols and ketones prepared according to our invention are a homogeneous mixture of the pigment in the alcohol or ketone, and contain substantially no coarse or aggregated particles. The finely divided solid settles out of such dispersions only slowly over a long period of time.

In the practice of our invention the quantity of dispersing agent employed is relatively small. For most purposes the amount between 0.1% and 0.5% based on the weight of the alcohol or ketone used is usually sufficient for the dispersion of the titanium pigment in the alcohol or ketone. Generally, amounts between 0.1% and 2.0% based on the weight of the alcohol or ketone are effective.

According to our invention the dispersion of the titanium pigment in the alcohol or ketone may be conveniently carried out by intimately mixing the titanium pigment in the alcohol or ketone in admixture with the dispersing agent, for example, in a suitable vessel equipped with a mechanical stirring apparatus. On the other hand, the operation may be carried out in a ball-mill, or similar device. According to another method of our invention a paste containing the dispersing agent, alcohol or ketone, and a relatively large amount of titanium pigment may first be prepared. This paste may then be diluted with additional alcohol or ketone to obtain dispersions having any desired proportion of titanium pigment and alcohol or ketone.

The tannic acid composition may be dissolved in the alcohol or ketone prior to or during the admixture with the titanium pigment or, on the other hand, all three materials may be mixed together simultaneously.

By the term "tannic acid composition" used in this description and in the claims appended hereto we mean to include derivatives of polyhydroxy-benzoic acids, such as gallotannic acid, tannic acid, pyrogallic acid, and other tanning materials naturally occurring in various barks and nuts and which are capable of tanning leather. By the term "low molecular weight aliphatic alcohols" we mean to include aliphatic alcohols having five or less carbon atoms per molecule, whether primary, secondary, or tertiary. By the term "low molecular weight ketones" we mean to include ketones having seven or less carbon atoms per molecule. In the use of the expression "titanium pigment" we mean to include titanium dioxide pigment, titanium dioxide-barium sulphate pigment, titanium dioxide-calcium sulphate pigments, etc.

Thus having described our invention the following specific examples are given for illustration from which, however, no undue limitations are to be construed.

Example No. 1.—0.5 pound of tannic acid, 25 gallons of ethanol, and 85 pounds of calcined pigmentary titanium dioxide are milled together in a ball-mill for about 30 minutes.

The resulting mixture is a free-flowing, liquid, homogeneous dispersion of titanium dioxide in the ethanol, containing substantially no coarse or aggregated particles and from which the finely divided titanium pigment settles out of suspension very slowly over a long period of time.

Example No. 2.—0.5 pound of gallotannic acid is dissolved in 7.6 gallons of methanol in a mechanical mixer. To this solution while stirring is added 100 pounds of calcined pigmentary titanium dioxide. Mixing is continued until a homogeneous paste is obtained.

This paste then serves as a master batch which may be diluted with additional methanol to obtain a free-flowing, liquid, homogeneous dispersion having any desired proportion of the calcined pigmentary titanium dioxide and methanol.

A paste such as this is suitable for mixture with alcohol solutions of aniline dyes for making covering aniline printing inks which have a high consistency and are particularly useful in printing upon Cellophane, water-proof cellulose folios, kraft paper, paper sacks, etc.

Example No. 3.—0.5 pound of gallotannic acid, 15 gallons of acetone, and 67 pounds of calcined pigmentary titanium dioxide are milled together in a ball mill for about one hour.

The resulting mixture is a free-flowing, liquid, homogeneous disperson of the pigment in the acetone, and contains substantially no coarse or aggregated particles.

Example No. 4.—One pound of tannic acid is dissolved in 15 gallons of hexanone (methyl-n-butyl ketone) in a mechanical mixer of the enclosed, sigma-blade type. To this solution, while stirring, is added 200 pounds of calcined pigmentary titanium dioxide. Mixing is continued until a homogeneous paste is obtained.

This paste then serves as a master batch which may be diluted with additional hexanone to obtain a free-flowing, liquid, homogeneous dispersion having a desired proportion of pigment in hexanone.

A paste such as this is suitable for mixture with ketonic solutions of vinyl chloride-acetate conjoint polymers for the preparation of pigmented coating compositions.

It is well known that the ordinary type of aniline-printing ink is too transparent for printing upon Cellophane, water-proof cellulose folios, kraft paper, paper sacks, etc. Consequently, attention of manufacturers has been directed to the use of opaque inks, such as quick-drying opaque aniline inks which possess a comparatively more desirable covering property for printing upon the aforementioned materials.

Yet, there prevails a hesitancy on the part of manufacturers to use quick-drying, opaque aniline inks, the opacity of which is attempted by incorporating within the ink finely-divided solid pigments. This is due to the undesirable quick-settling property of these inks, which necessitates costly, constant additions of the quick-drying vehicle to maintain the pigment in suspension.

This undesirable quick-settling property may be conveniently overcome by means of the present invention, e. g. as shown in Example No. 1 above by including as one of the components in the manufacture of the aniline ink a small amount of a tannic acid composition which will disperse the pigment to form a homogeneous, substantially non-settling, quick-drying, opaque printing ink.

The foregoing description has been given for clearness of understanding, and no undue limitations should be understood therefrom, but the appended claims should be construed as broadly as possible in view of the prior art.

We claim:

1. A method for dispersing titanium pigment in aliphatic alcohols and ketones which comprises intimately mixing a titanium pigment with a liquid selected from the group consisting of liquid aliphatic alcohols and ketones in admixture with a small amount of a tannic acid composition.

2. A method for dispersing titanium pigment in aliphatic alcohols and ketones which comprises intimately mixing titanium pigment with a liquid selected from the group consisting of aliphatic alcohols and ketones in admixture with a tannic acid composition in an amount between 0.1% and 2.0% based on the weight of the liquid used.

3. A method for dispersing titanium pigment in a low molecular weight aliphatic alcohol which comprises intimately mixing a titanium pigment with an aliphatic alcohol having not more than five carbon atoms in the molecule in admixture with a small amount of a tannic acid composition.

4. A method for dispersing titanium pigment in a low molecular weight ketone which comprises intimately mixing titanium pigment with an aliphatic ketone having no more than seven carbon atoms in the molecule in admixture with a small amount of a tannic acid composition.

5. A method for dispersing titanium dioxide in ethyl alcohol which comprises intimately mixing finely-divided titanium dioxide with ethyl alcohol in admixture with an amount of tannic acid between 0.1% and 2.0% based on the weight of the ethyl alcohol.

6. A method for dispersing titanium dioxide in acetone which comprises intimately mixing finely-divided titanium dioxide with acetone in admixture with an amount of gallotannic acid between 0.1% and 2.0% based on the weight of the acetone.

7. A method for dispersing a titanium pigment in aliphatic alcohols and ketones which comprises first intimately mixing a titanium pigment with a liquid selected from the group consisting of alcohols and ketones in admixture with a small amount of a tannic acid composition to form a paste, and then adding to the resulting paste an additional quantity of the said liquid to obtain a free-flowing, liquid, uniform dispersion of the said titanium pigment in the said liquid.

8. As a new article of manufacture, a liquid, substantially non-settling, uniform dispersion of a titanium pigment in an aliphatic alcohol containing a small amount of a tannic acid composition.

9. As a new article of manufacture, a liquid, substantially non-settling, uniform dispersion of a titanium pigment in an aliphatic ketone containing a small amount of a tannic acid composition.

10. As a new article of manufacture, a liquid, substantially non-settling, uniform dispersion of titanium dioxide in ethyl alcohol containing between 0.1% and 2.0% tannic acid based on the weight of the ethyl alcohol used.

11. As a new article of manufacture, a liquid, substantially non-settling, uniform dispersion of titanium dioxide in acetone containing between 0.1% and 2.0% gallotannic acid based on the weight of the acetone used.

12. As a new article of manufacture, a liquid, substantially non-settling, uniform dispersion of titanium dioxide in an aliphatic alcohol solution of an aniline dye containing a small amount of a tannic acid composition.

13. As a new article of manufacture, a liquid, substantially non-settling, uniform dispersion of a titanium pigment in a ketonic solution of a vinyl chloride-acetate conjoint polymer containing a small amount of a tannic acid composition.

WALTER WM. PLECHNER.
JOSEPH M. JARMUS.